United States Patent
Vest et al.

(10) Patent No.: US 12,544,957 B2
(45) Date of Patent: Feb. 10, 2026

(54) CURING OF FLEXO PRINTING ELEMENTS USING UV LED SYSTEMS

(71) Applicant: MacDermid Graphics Solutions, LLC, Waterbury, CT (US)

(72) Inventors: Ryan W. Vest, Mequon, WI (US); Kyle P. Baldwin, Acworth, GA (US); Tyler Hatmaker, Dallas, GA (US)

(73) Assignee: MacDermid Graphics Solutions, LLC, Waterbury, CT (US)

( * ) Notice: Subject to any disclaimer, the term of this patent is extended or adjusted under 35 U.S.C. 154(b) by 156 days.

(21) Appl. No.: 18/419,837

(22) Filed: Jan. 23, 2024

(65) Prior Publication Data

US 2025/0236052 A1 Jul. 24, 2025

(51) Int. Cl.
| | |
|---|---|
| *B29C 35/08* | (2006.01) |
| *B29C 39/02* | (2006.01) |
| *B29K 105/00* | (2006.01) |
| *B29L 31/00* | (2006.01) |

(52) U.S. Cl.
CPC ........ *B29C 35/0805* (2013.01); *B29C 39/026* (2013.01); *B29C 2035/0827* (2013.01); *B29K 2105/0058* (2013.01); *B29L 2031/767* (2013.01)

(58) Field of Classification Search
CPC ... B29C 45/1744; B29C 39/04; B29C 39/026; B29C 35/0805
See application file for complete search history.

(56) References Cited

U.S. PATENT DOCUMENTS

| | | | |
|---|---|---|---|
| 3,597,080 A | 8/1971 | Gush et al. | |
| 3,794,494 A | 2/1974 | Kai et al. | |
| 3,960,572 A | 6/1976 | Ibata et al. | |
| 4,442,302 A | 4/1984 | Pohl | |
| 5,213,949 A | 5/1993 | Kojima et al. | |
| 5,813,342 A | 9/1998 | Strong | |
| 6,245,487 B1 | 6/2001 | Randall | |
| 9,703,201 B2 | 7/2017 | Vest et al. | |
| 10,036,956 B2 | 7/2018 | Baldwin et al. | |
| 10,139,730 B2 | 11/2018 | Vest | |
| 2006/0084008 A1* | 4/2006 | Long | G03F 7/2014 430/302 |
| 2008/0107908 A1 | 5/2008 | Long et al. | |
| 2012/0082932 A1 | 4/2012 | Battisti et al. | |
| 2012/0266767 A1 | 10/2012 | Klein et al. | |
| 2013/0242276 A1 | 9/2013 | Schadebrodt et al. | |
| 2014/0080042 A1 | 3/2014 | Maneira | |
| 2017/0131636 A1 | 5/2017 | Vest | |
| 2022/0269178 A1 | 8/2022 | Wolterink et al. | |

FOREIGN PATENT DOCUMENTS

CN    115657426 A    1/2023

* cited by examiner

*Primary Examiner* — Stella K Yi
(74) *Attorney, Agent, or Firm* — Carmody Torrance Sandak & Hennessey LLP (57) ABSTRACT

A method of exposing a layer of liquid photopolymer resin to actinic radiation from a UV light source to crosslink and cure the layer of liquid photopolymer resin. The liquid photopolymer resin is capable of being selectively crosslinked and cured upon exposure to actinic radiation at a desired wavelength. The exposure unit includes a plurality of UV LED light tubes arranged at a distance from a surface of the layer of liquid photopolymer resin.

19 Claims, 4 Drawing Sheets

CURING OF FLEXO PRINTING ELEMENTS USING UV LED SYSTEMS

FIELD OF THE INVENTION

The present invention relates generally to a method of curing flexographic printing elements made from liquid photopolymer resins using UV LED light.

BACKGROUND OF THE INVENTION

Flexography is a method of printing that is commonly used for high-volume runs. Flexography is employed for printing on a variety of substrates such as paper, paperboard stock, corrugated board, films, foils and laminates. Newspapers and grocery bags are prominent examples. Coarse surfaces and stretch films can be economically printed only by means of flexography.

The demands placed on flexographic printing plates are considerable and it is highly desirable that flexographic printing plates work well under a wide range of conditions. For example, the printing plates should be able to impart their relief image on a wide range of substrates, including cardboard, coated paper, newspaper, calendared paper, and polymeric films such as polypropylene. Importantly, the image should be transferred quickly and with fidelity, for as many prints as the printer desires to make. A flexographic printing plate must also have sufficient flexibility to wrap around a printing cylinder yet be strong enough to withstand the rigors experienced during a typical printing process. The printing plate should exhibit a low hardness to facilitate ink transfer during printing. It is also important that the surface of the printing plate be dimensionally stable during storage. In addition, the printing plate must also have a relief image that has a chemical resistance against the aqueous-based or alcohol-based inks that are typically used in flexographic printing. Finally, it is also highly desirable that the physical and printing properties of the printing element are stable and do not change during printing.

Flexographic printing plates can be made from liquid photopolymer resins, which has the advantage that uncured resin can be reclaimed from the non-image areas of the printing elements and used to make additional printing plates. Liquid photopolymer resins have a further advantage in terms of flexibility, which enables the production of any required plate gauge simply by changing the machine settings.

The liquid photopolymer is typically a material that is both fluid when uncured and hardens upon exposure to selective wavelengths of actinic radiation. Upon exposure to actinic radiation, the liquid photopolymer resin polymerizes and changes from a liquid state to a solid state to form a raised relief image. One or more different photopolymer resins or resin compositions may be employed. Examples of liquid photopolymer resins include those described above and in U.S. Pat. No. 3,794,494 to Kai et al., U.S. Pat. No. 3,960,572 to Ibata et al. and U.S. Pat. No. 4,442,302 to Pohl, the subject matter of each of which is herein incorporated by reference in its entirety.

Alternatively, instead of a negative, one or more programmable screens may be used to create a "digital" negative as described, for example, in U.S. Pat. No. 10,139,730 to Vest, the subject matter of which is herein incorporated by reference in its entirety.

Various processes have been developed for producing printing plates from liquid photopolymer resins as described, for example, in U.S. Pat. No. 5,213,949 to Kojima et al., U.S. Pat. No. 5,813,342 to Strong et al., U.S. Pat. Pub. No. 2008/0107908 to Long et al., and U.S. Pat. No. 3,597,080 to Gush, the subject matter of each of which is herein incorporated by reference in its entirety.

After the exposure is complete, the printing plate is removed from the exposure unit and the photopolymer that was not exposed to actinic radiation (i.e., the photopolymer covered by the negative) is reclaimed for further use. This "reclamation" step typically involves squeegeeing, vacuuming or otherwise removing liquid photopolymer remaining on the surface of the printing plate.

The exposure unit uses one or more sources of actinic radiation to crosslink and dure the photopolymer resin, which one or more sources of actinic radiation are typically one or more fluorescent light sources. However, a major drawback to the use of fluorescent lights in the exposure unit is that their intensity drops over time, causing customers to constantly adjust their cure times, which also affects the consistency and quality of the cured printing plate. As a result, fluorescent bulbs must be changed on a routine basis. Since the bulbs contain mercury, disposal of the bulbs is considered hazardous.

It would be desirable to provide a replacement for a flood light exposure system that relies on fluorescent bulbs to provide a system that has greater stability, more consistent light output and a longer lifetime and that does not have issues with regards to bulb disposal.

SUMMARY OF THE INVENTION

It is an object of the present invention to provide an improved exposure system for use in a liquid platemaking process.

It is another object of the present invention to provide an improved exposure system that relies on UV LED light.

It is another object of the present invention to provide an exposure system that relies on UV LED light tubes.

In one embodiment, the present invention relates generally to a method of manufacturing a flexographic printing plate comprising the steps of:

a) optionally, securing a negative to a first glass platen, wherein the negative has opaque areas corresponding to a reverse of a desired relief image;

b) covering the negative or the glass platen with a transparent cover sheet;

c) casting at least one layer of liquid photopolymer resin on the transparent cover sheet;

d) covering the at least one layer of liquid photopolymer resin with a backing sheet;

e) positioning a second glass platen above the backing sheet;

f) exposing the at least one layer of liquid photopolymer resin to actinic radiation to selectively crosslink and cure the at least one layer of liquid photopolymer resin and form the desired relief image therein; wherein the step of exposing the at least one layer of liquid photopolymer resin to actinic radiation comprises:

(i) selectively exposing the at least one layer of liquid photopolymer resin to actinic radiation from a first source of actinic radiation positioned below the first glass platen to form the desired relief image in the at least one layer of liquid photopolymer resin; and (ii) exposing the at least one layer of liquid photopolymer resin to actinic radiation from a second source of actinic radiation positioned above the second glass platen to cure a portion of the least one layer of liquid photopolymer resin to create a cured floor in the least one layer of liquid photopolymer resin; and g) washing away uncured portions of the at least one layer of liquid photopolymer resin to reveal the desired relief image;

wherein at least one of the first source of actinic radiation and the second source of actinic radiation comprises a plurality of UV LED light tubes.

BRIEF DESCRIPTION OF THE FIGURES

Features and aspects of embodiments are described below with reference to the accompanying Figures, in which elements are not necessarily depicted to scale.

DETAILED DESCRIPTION OF THE PREFERRED EMBODIMENTS

As used herein, the terms "a" "an," and "the" refer to both singular and plural referents unless the context clearly dictates otherwise.

As used herein, the term "about" refers to a measurable value such as a parameter, an amount, a temporal duration, and the like and is meant to include variations of +/−15% or less, preferably variations of +/−10% or less, more preferably variations of +/−5% or less, even more preferably variations of +/−1% or less, and still more preferably variations of +/−0.1% or less of and from the particularly recited value, in so far as such variations are appropriate to perform in the invention described herein. Furthermore, it is also to be understood that the value to which the modifier "about" refers is itself specifically disclosed herein.

As used herein, spatially relative terms, such as "beneath," "below," "lower" "above," "upper" and the like, are used for ease of description to describe one element or feature's relationship to another element(s) or feature(s). Spatially relative terms may be intended to encompass different orientations in addition to the orientation depicted in the figures. Thus, the example term "below" can encompass both an orientation of above and below. It is further understood that the terms "front" and "back" are not intended to be limiting and are intended to be interchangeable where appropriate.

As used herein, the terms "comprises" and/or "comprising," specify the presence of stated features, integers, steps, operations, elements, and/or components, but do not preclude the presence or addition of one or more other features, integers, steps, operations, elements, components, and/or groups thereof.

As used herein for purposes of the present disclosure, the term "LED" refers to an electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs.

LEDs are semiconductor devices which use the phenomenon of electroluminescence to generate light. LEDs consist of a semiconducting material doped with impurities to create a p-n junction capable of emitting light as positive holes join with negative electrons when voltage is applied. The wavelength of emitted light is determined by the materials used in the active region of the semiconductor. Typical materials used in semiconductors of LEDs include, for example, elements from Groups (III) and (V) of the periodic table. These semiconductors are referred to as III-V semiconductors and include, for example, GaAs, GaP, GaAsP, AlGaAs, InGaAsP, AlGaInP and InGaN semiconductors. The choice of materials is based on multiple factors including desired wavelength of emission, performance parameters and cost.

The term "lighting fixture" is used herein to refer to an implementation or arrangement of one or more lighting units in a particular form factor, assembly, or package, and may be associated with (e.g., include, be coupled to and/or packaged together with) other components, for example an electromagnetic (EM) ballast, in particular for supplying power.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

Lighting suppliers in the flexographic printing plate industry have created LED light bar systems that include an array of high intensity LED lights that cure the printing plate in one or more passes. The curing devices that incorporate LEDs have generally utilized high intensity UV LEDs that are arranged in an array or an assembly. For example, the UV LEDs may be arranged in a light bar, and the light bar and the photocurable printing blank move relative to each other (i.e., the light bar travels over the printing or the plate travels under the light bar), in order to cure the entire plate surface, as described, for example, in U.S. Pat. Pub. No. 2012/0266767 to Klein et al., the subject matter of which is herein incorporated by reference in its entirety. The light exposure unit can be used to produce printing elements having flat tops and round tops on the same plate using a digital workflow. U.S. Pat. Pub. No. 2013/0242276 to Schadebrodt et al., the subject matter of which is herein incorporated by reference in its entirety, describes a method of producing flexographic printing elements including the steps of exposing the printing element to actinic light at a high intensity with a plurality of UV LEDs and then exposing the printing element to actinic light at a lower intensity from a UV radiation source other than UV-LEDs.

However, flood light exposure performs better for the formation of flexographic printing dots than multiple passes of a light bar. In addition, the use of multiple passes of a light bar is also significantly slower than the use of flood light exposure. That is, a typical standard flexographic printing plate cures in about 8 to 10 minutes using a conventional flood fluorescent tube exposure system, while the same plate may require 20 to 30 minutes to cure using an LED light bar system.

U.S. Pat. No. 10,036,956 to Baldwin et al., the subject matter of which is herein incorporated by reference in its entirety, describes a method of flood exposing a photocurable printing blank to actinic radiation from a UV LED light source which includes a high intensity UV LED light source that is modulated to a lower intensity.

As described herein, the present invention relates generally to a method of using UV LED light tubes in an exposure unit in a liquid platemaking process in order to improve consistency and quality of the resulting flexographic relief image printing plate.

In one embodiment, the present invention relates generally to a method of manufacturing a flexographic printing plate comprising the steps of:
a) optionally, securing a negative to a first glass platen, wherein the negative has opaque areas corresponding to a reverse of a desired relief image;
b) covering the negative or the glass platen with a transparent cover sheet;
c) casting at least one layer of liquid photopolymer resin on the transparent cover sheet;
d) covering the at least one layer of liquid photopolymer resin with a backing sheet;
e) positioning a second glass platen above the backing sheet;
f) exposing the at least one layer of liquid photopolymer resin to actinic radiation to selectively crosslink and cure the one layer of liquid photopolymer resin and form the desired relief image therein; wherein the step of exposing the at least one layer of liquid photopolymer resin to actinic radiation comprises:
    (i) selectively exposing the at least one layer of liquid photopolymer resin to actinic radiation from a first source of actinic radiation positioned below the first glass platen to form the desired relief image in the at least one layer of liquid photopolymer resin; and
    (ii) exposing the at least on layer of liquid photopolymer resin to actinic radiation from a second source of actinic radiation positioned above the second glass platen to cure a portion of the least one layer of liquid photopolymer resin to create a cured floor in the at least one layer of liquid photopolymer resin; and
g) washing away uncured portions of the at least one layer of liquid photopolymer resin to reveal the desired relief image;

wherein at least one of the first source of actinic radiation and the second source of actinic radiation comprises a plurality of UV LED light tubes.

As described herein, UV LED light tubes can be used in a liquid platemaking process to replace the conventional source of actinic radiation such as carbon arcs, mercury-vapor arcs, fluorescent lamps, electron flash units, electron beam units, photographic flood lamps and conventional LEDs used for curing liquid photopolymer resins. Conventional LED lights used in platemaking processes are generally high intensity UV LEDs that expose the printing element to actinic radiation at a high intensity that can be difficult to modulate and/or control.

The use of UV LED light tubes in a liquid platemaking system has the advantage of improving consistency and quality of the finished plate. In addition, unlike conventional light sources, the wavelength and intensity of the UV LED light tubes can be precisely controlled so that the intensity remains the same across the width of the glass platen and the at least one layer of liquid photopolymer can be uniformly exposed.

In one embodiment, each of the upper source of actinic radiation and the lower source of actinic radiation comprise a bank of UV LED lights tubes that are arranged at least substantially equidistant from each other across the width of the glass platen, wherein each UV LED light tube has a length that extends at least substantially across the depth of the glass platen. That is, it is desirable that the arrangement of the UV LED light tubes in the bank of UV LED light tubes be configured so that the at least one layer of liquid photopolymer can be exposed to actinic radiation in a desired fashion. In addition, each of the UV LED light tubes in the upper exposure unit and each of the UV LED light tubes in the lower exposure unit are separately connected to a suitable controller or controllers that is/are capable of individually modulating and/or controlling the intensity of each of the plurality of UV LED light tubes.

This allows for the flood exposure to be varied across the width of the photocurable printing blank being exposed, if necessary, so that different areas of the printing blank can be custom exposed. In addition, individually controlling the intensity of the each of the plurality of LED light tubes can also compensate for output power decay caused by aging of the plurality of UV LED light tubes to provide consistent and uniform intensity that remains the same across the width of the photocurable printing blank being exposed.

In one embodiment, each of the UV LED light tubes in the exposure unit is connected to the controller and each of the UV LED light tubes is individually controlled by the controller to modulate and/or control the output intensity of each of the plurality of UV LED light tubes. In one embodiment, the wavelength of each of the plurality of UV LED light tubes operates in the range of about 355 to about 405 nm, more preferably about 365 nm to about 395 nm. In one embodiment, each UV LED light tubes is individually adjusted and/or controlled to have an output intensity in the range of about 10 to about 40 mW/cm$^2$, more preferably about 25 to about 35 mW/cm$^2$, more preferably at about 30 mW/cm$^2$, when arranged at a distance of about 1 to about 2 inches from the surface of the glass platen.

In one embodiment, each of the UV LED light tubes has a length within a range of about 2 feet to about 10 feet, more preferably a length within a range of about 4 to about 8 feet. The opposite ends of each of the UV LED light tubes have connectors configured to allow each UV LED light tube to be installed in a socket configured to receive the UV LED light tubes. In one embodiment, the UV LED light tube is configured to have the dimensions of a standard UV fluorescent bulb and the UV LED light tube can be retrofitted into an exposure unit designed for fluorescent bulbs.

One advantage to using an UV LED tube system as described herein is that it can be used in an existing system. In one embodiment, the UV LED light tubes can be retrofitted into an existing system that relies on fluorescent light tubes. There are currently two types of LED tube light methods. The first is a direct plug and play system that does not require any extra wiring and the second is a system in which wiring is used to bypass the ballast. Both of these types of LED tube bulb systems can be used in the practice of the instant invention.

In one embodiment, each of the UV LED light tubes comprises at least one or at least two or at least three rows of LED chips arranged along the length of the UV LED light tube. In addition, in one embodiment, each of the rows of LED chips is preferably arranged on the same plane, meaning that there is no curvature or angles between the different rows of LED chips in the UV LED light tube. Because the UV LED light tubes are generally closely arranged within the exposure unit, the arrangement of the rows of LED chips on the same plane allows for overlapping exposure from the multiple LED light tubes exposing the surface of the photocurable printing blank. Alternatively, the rows of LED chips are arranged on different planes or at an angle to each other in order to adjust the angle of the light.

In one embodiment the LED chips are positioned on a circuit board that extends the length of the UV LED light tube. The circuit board may be mounted on or otherwise connected with a base that includes a heat that is made of metal, which metal is preferably aluminum or an aluminum alloy. The LED chips are preferably connected in series. In one embodiment, each row of LED chips is separately connected in series to the circuit board to allow for individual operation of each row of LED chips.

In one embodiment, the UV LED chips are spaced apart at a distance of about 0.25 inches to about 2 inches, more preferably about 0.5 to about 1 inches along the length of the UV LED light tube. The spacing of the LED chips will depend in part on the size and intensity of the individual chips as well as the number of rows of LED chips in the UV LED tube.

The plurality of UV LED light tubes generally comprises at least 5 UV LED light tubes, or at least 10 UV LED light tubes, or at least 20 UV LED light tubes, or at least 30 UV LED light tubes so the plurality of UV LED light tubes extends over the entire surface of the photocurable printing blank situated in the exposure unit. This allows the plurality of UV LED light tubes to be fixedly mounted so that the plurality of UV LED light tubes do not move relative to each other during the flood exposure step. These UV LED light tubes may be spaced apart at a distance of about 1 inch to about 4 inches, more preferably at a distance of about 1.5 to about 3 inches on center along the length of the UV LED light tube.

The light emitting side of the UV LED tubes is preferably covered with a UV-transmissive cover to protect the LED chips from dust and solvents. The UV-transmissive cover may comprises a polymer such as polymethylmethacrylate or other similar material. The cover generally has a semi-cylindrical shape and extends along the entire length of the UV-LED light tube. The cover may be attached to the base by any means known in the art, including, for example, an adhesive, which may be a UV-curable adhesive.

Once the photocurable printing blank has been flood exposed to actinic radiation by the method described herein, the resulting relief image printing element can be developed to remove the uncrosslinked and/or uncured photopolymer and reveal the relief image therein.

As also described herein, it contemplated that the use of UV LED light tubes can be used in various liquid platemaking systems, including systems that use a conventional (i.e. photographic) negative secured to the glass platen and systems in which a programmable screen is utilized such as described in U.S. Pat. No. 10,139,730. Furthermore, because the controller provides individual control of each of the UV LED light tubes, the flood exposure can also be various across the width of the at least one layer of liquid photopolymer being exposed to create islands of cured photopolymer or otherwise custom exposure of the at least one layer of liquid photopolymer.

In another embodiment, the UV LED light tubes are collimated. The inventors have found that during the exposure step, altering the type, power and incident angle of illumination through the use of collimated light can beneficially change the shape of printing dots formed on the flexographic relief image printing element. It is believed that the collimated light removes or limits diffusion of air into the layer of liquid photopolymer resin during exposure to actinic radiation. One methods of collimating the at least one source of actinic radiation is through the use of a collimating grid that is arranged between the at least source of actinic radiation and the glass platen during the exposure step. An example of a use of a collimating grid is described in U.S. Pat. No. 6,245,487 to Randall, the subject matter of which is herein incorporated by reference in its entirety.

In another embodiment, a mixed system can be used in which a bank of UV LED light tubes is used as an upper source of actinic radiation to create a cured layer of photopolymer in the layer of liquid photopolymer resin that will constitute the floor layer of the printing plate (i.e., back exposure) and a scanning light bar comprising a plurality of UV LEDs is used as a lower source of actinic radiation to face expose the liquid photopolymer resin and create the relief image therein. The use of a scanning light bar is described with respect to photopolymer printing platemaking in U.S. Pat. No. 9,703,201 to Vest et al., the subject matter of which is herein incorporated by reference in its entirety.

The UV LED light system described herein which includes the bank of UV LED light tubes and optionally the scanning light bar preferably comprises one or more controllers, more preferably one or more microcontrollers, operatively connected thereto. The one or more microcontrollers are preferably configured to provide individual control of each of the plurality of UV LED light tubes and each of the individual UV LEDs on the light bar so that different sections/areas of the printing blank can be custom exposed. The microcontroller may also control whether the individual LEDs on the light bar are on/off, the duration of time they are on/off and the intensity of the individual LEDs. The result is individualized control of the UV LEDs.

Typically, the floor area of a flexographic printing element prepared from a liquid photopolymer accounts for at least about half of the plate thickness, with the remainder of the plate thickness being the relief area. The floor gives dimensional stability to the plate and provides support to the relief area. However, because so much of the photopolymer is used up in making a floor that covers the entire sheet, a variation on this process has been developed that minimizes the floor area and significantly increases the amount of liquid photopolymer that may be reclaimed. These printing plates are commonly referred to as "imposition plates," "island plates," or "I-plates."

I-plates are made by adding another step to the liquid platemaking process. The plates are first exposed to the upper UV light from the lid through the masking film, causing islands of cured polymer to be formed beginning in the photosensitive layer adjacent to the substrate. The timing and intensity of the exposure are limited to prevent the polymerization extending all the way through the photopolymer layer from the substrate to the free surface of the layer. The second lower UV exposure, from below the relief image negative, then causes the cured detailed relief image to form on top of the islands thus created. This process is described, for example, in U.S. Pat. Pub. No. 2012/0082932 to Battisti et al., U.S. Pat. Pub. No. 2014/0080042 to Maneira, and U.S. Pat. No. 10,139,730 to Vest, the subject matter of each of which is herein incorporated by reference in its entirety.

In one embodiment, the microcontroller may act to selectively turn on/off each of the plurality of UV LEDs as the light bar scans across a surface of the liquid photopolymer resin so that islands or an in-position frame of cured polymer can be created in the liquid photopolymer resin without the use of a negative masking film or any sort of masking technique. By individually controlling each of the UV LEDs, the controller can control the size and thickness of the islands created in the layer of photopolymer.

The flexographic relief image printing plated may also be subjected to various post exposure and detackification steps. Post exposure may involve submerging the plate in a water and salt solution and performing an additional exposure of the printing plate to actinic radiation (UV light) to fully cure the printing plate and to increase plate strength. The printing plate may then be rinsed and dried. In one embodiment, the UV LED light tubes described herein for use in the exposure unit can also be used in the post-exposure step to fully cure the printing plate.

A detackification step may also be performed using, for example, a germicidal unit (light finisher) to ensure a tack-free plate surface. This step is not require for all plates, as certain resins may be tack-free and thus printing press ready without the need for the detackification step.

Example

Photocurable printing blanks were prepared comprising a photocurable layer on a support layer and the photoinitiator was selected for exposure at a 365 nm wavelength. The photocurable printing blanks were then imaged using an LED light bar system of the prior art operating at a wavelength of 365 nm and a LED bank light table system of the instant invention operating at a wavelength of 365 nm in accordance with the invention for a suitable exposure time to achieve the desired image.

The plates were imaged to create 1% dots, 5% dots, 50% dots and 15 mil reverse images and the results are shown in FIGS. 1-8.

The exposure time for the LED light bar system was 12 minutes, while the exposure time for the LED bank light table system was only 5 minutes. So, the time required for exposure using the system of the instant invention was less than half of the time required using an LED light bar system.

Figure 1:
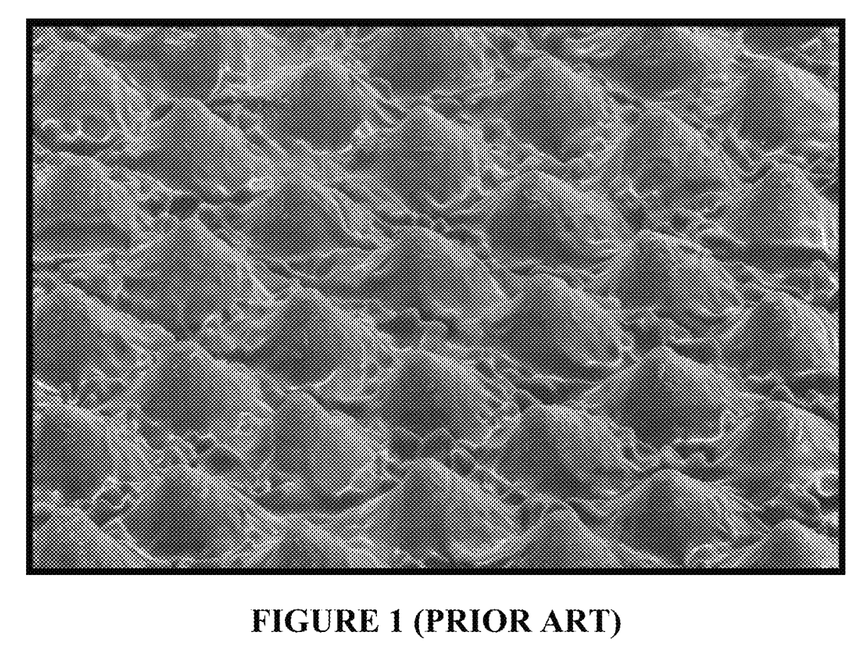
FIG. 1 depicts 1% printing dots imaged using an LED light bar of the prior art.
Figure 2:
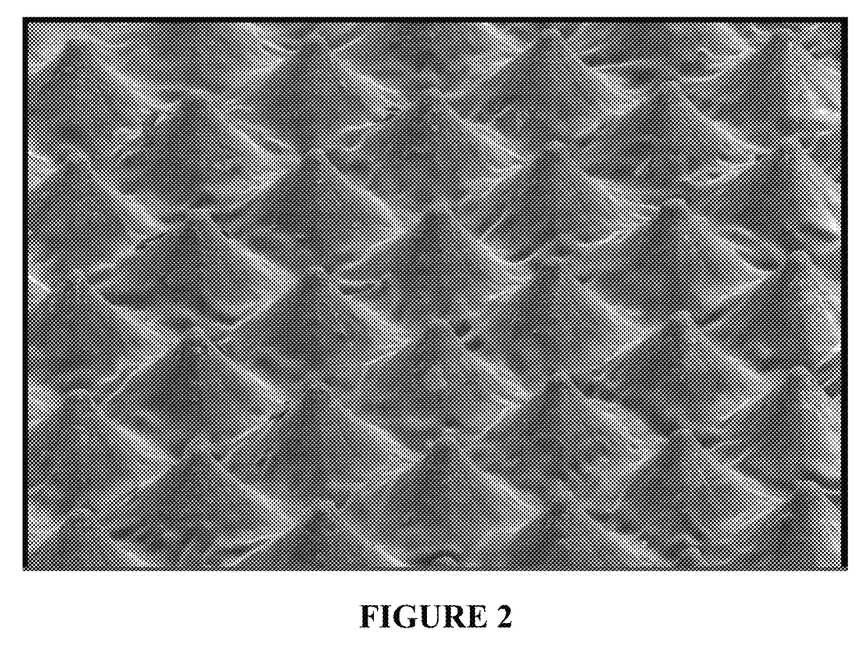
FIG. 2 depicts 1% printing dots imaged using a bank of UV LED light tubes in accordance with the invention.
Figure 3:
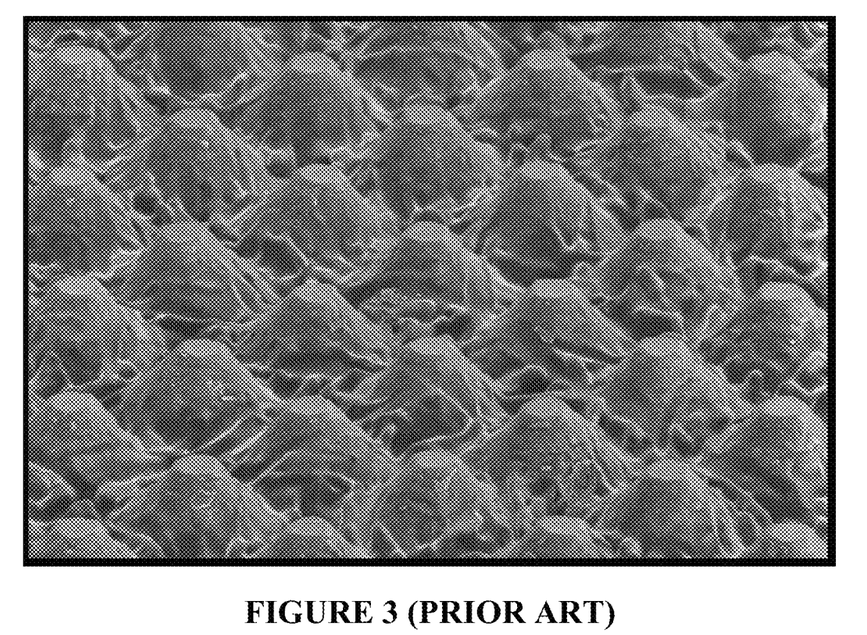
FIG. 3 depicts 5% printing dots imaged using an LED light bar of the prior art.
Figure 4:
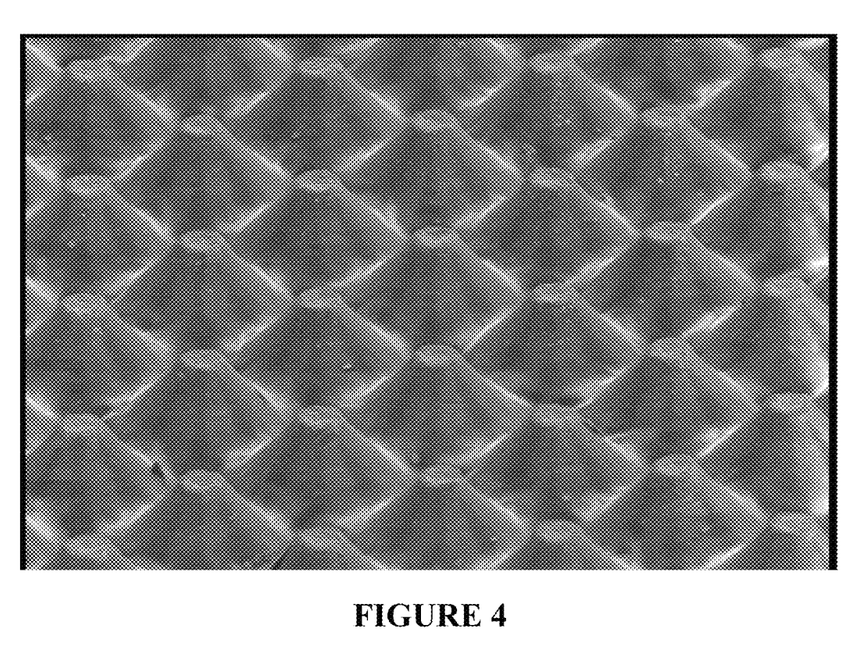
FIG. 4 depicts 5% printing dots imaged using a bank of UV LED light tubes in accordance with the invention.
Figure 5:
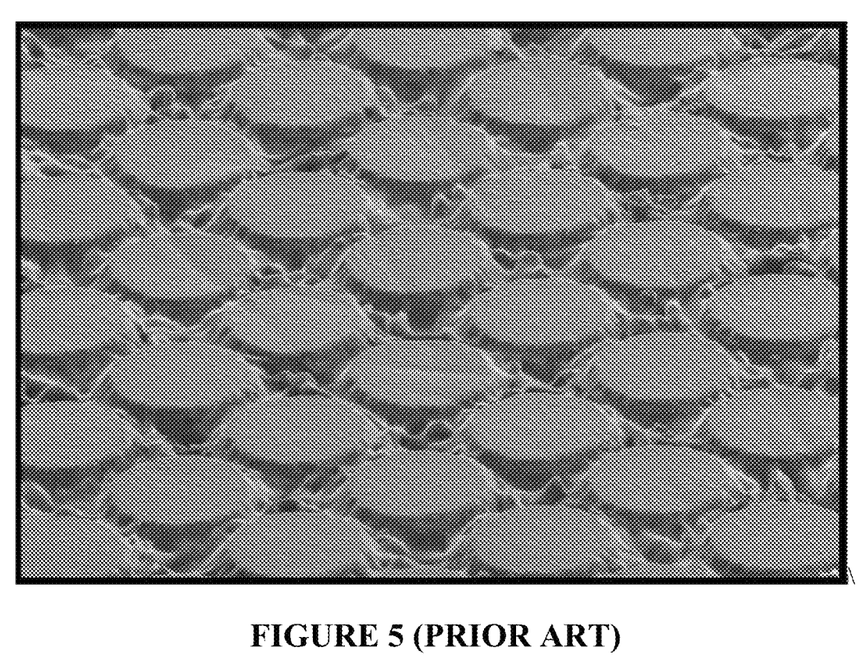
FIG. 5 depicts 50% printing dots imaged using an LED light bar of the prior art.
Figure 6:
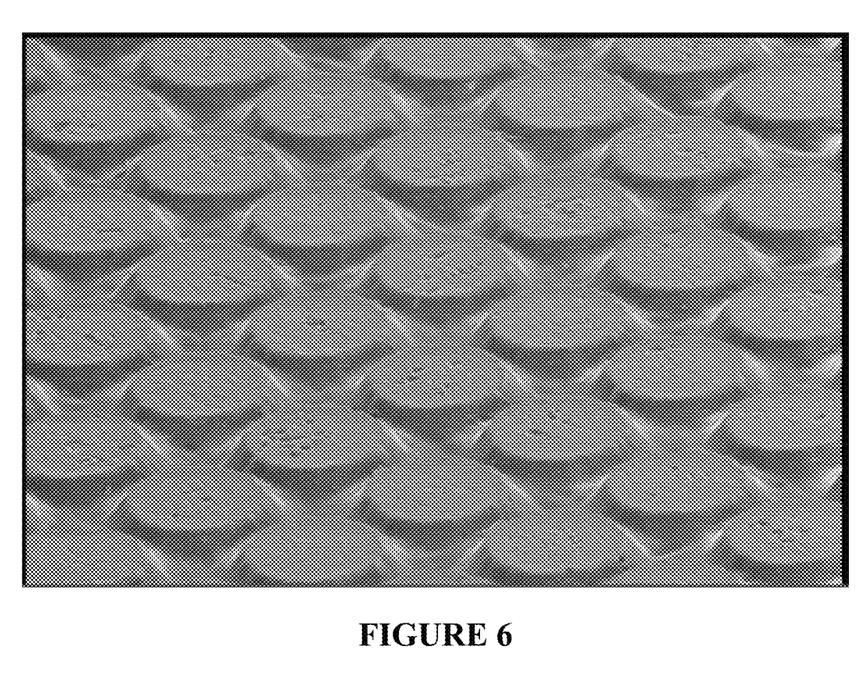
FIG. 6 depicts 50% printing dots imaged using a bank of UV LED light tubes in accordance with the invention.

FIG. 1 depicts 1% dots imaged using the LED light bar system while FIG. 2 depicts 1% dots imaged using the LED bank light table system. Similarly FIGS. 3 and 4 depict 5% dots imaged using the LED light bar system versus the LED bank light table system and FIGS. 5 and 6 depict 50% dots imaged using the LED light bar system versus the LED bank light table system. As seen from FIGS. 1, 3, and 5, the image quality is significantly worse when using the LED light bar system as compared with the image quality achieve with the LED light bar system as shown in FIGS. 2, 4, and 6.

Figure 7:
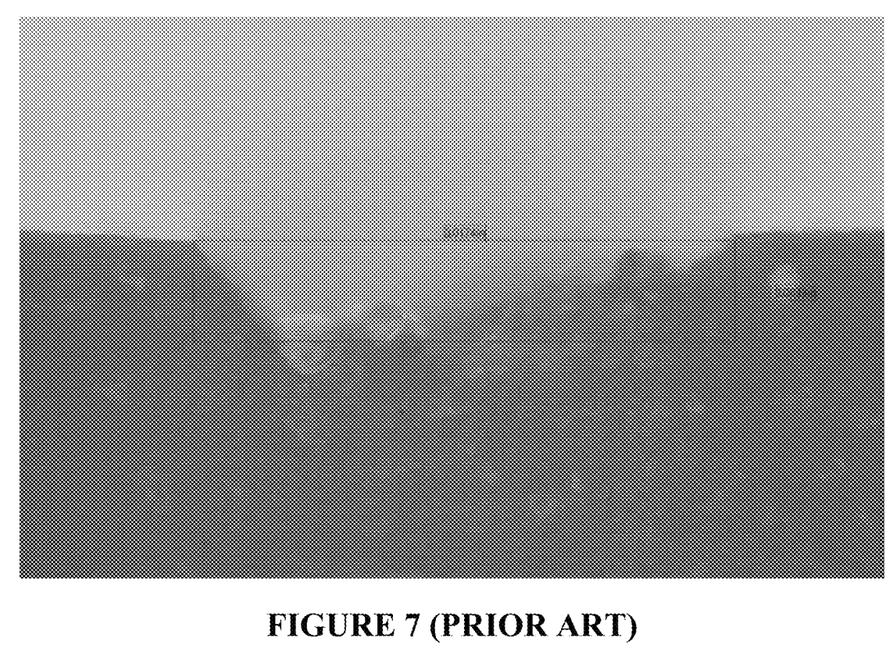
FIG. 7 depicts 15 mil reverses imaged using an LED light bar of the prior art.
Figure 8:
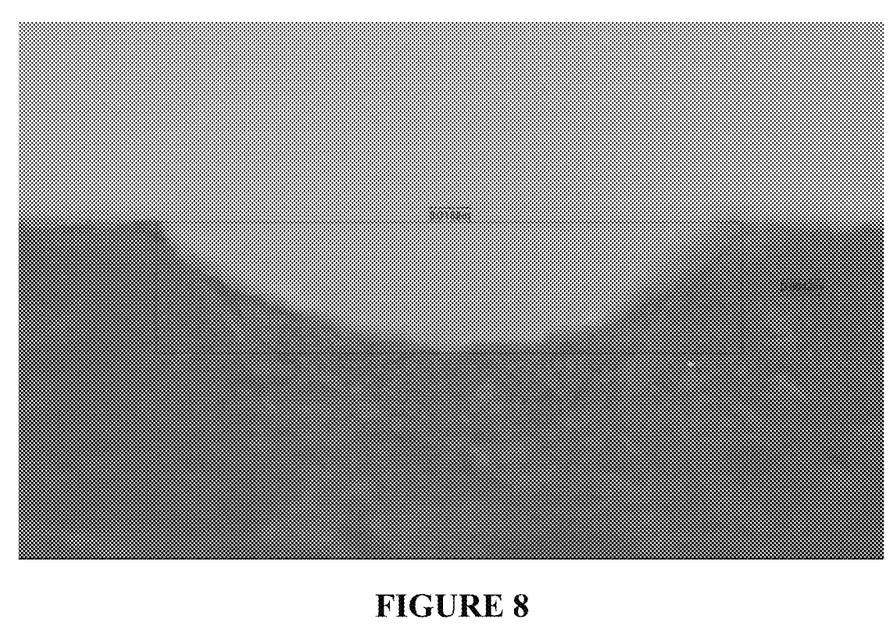
FIG. 8 depicts 15 mil reversed imaged using a bank of UV LED light tubes in accordance with the invention.

FIGS. 7 and 8 show a similar result for dot clean out and reverse depth. As shown in FIG. 7, the dot clean out and reverse depth is much worse when cured with the light bar system as compared with the LED bank light system as shown in FIG. 8.

As shown in the Example, the inventors of the present invention have demonstrated that the method described herein that incorporates the use of an exposure system and includes the plurality of UV LED light tubes is capable of producing a high quality flexographic relief image printing plate in less time and in a reproducible manner as compared with exposure systems of the prior art. The claimed method overcomes the deficiencies of printing plates produced using prior art fluorescent bulbs and can be modified and optimized to produce a good result with all types of relief image printing plates.

In addition, while the method is described in the context of sheet polymers, it is also believed that the exposure unit described herein could be used to produce relief image printing elements from liquid photopolymer resins while achieving an image quality comparable to FIGS. 2, 4, 6, and 8 and attaining a similar shortened exposure time.

Finally, it should also be understood that the following claims are intended to cover all of the generic and specific features of the invention described herein and all statements of the scope of the invention that as a matter of language might fall there between.

What is claimed is:

1. A method of manufacturing a flexographic printing plate comprising the steps of:
    a) optionally, securing a negative to a first glass platen, wherein the negative has opaque areas corresponding to a reverse of a desired relief image;
    b) covering the negative or the first glass platen with a transparent cover sheet;
    c) casting at least one layer of liquid photopolymer resin on the transparent cover sheet;
    d) covering the at least one layer of liquid photopolymer resin with a backing sheet;
    e) positioning a second glass platen above the backing sheet;
    f) exposing the at least one layer of liquid photopolymer resin to actinic radiation to selectively crosslink and cure the at least one layer of liquid photopolymer resin and form the desired relief image therein; wherein the step of exposing the at least one layer of liquid photopolymer resin to actinic radiation comprises:
        (i) selectively exposing the at least one layer of liquid photopolymer resin to actinic radiation from a first source of actinic radiation positioned below the first glass platen to form the desired relief image in the at least one layer of liquid photopolymer resin; and
        (ii) exposing the at least one layer of liquid photopolymer resin to actinic radiation from a second source of actinic radiation positioned above the second glass platen to cure a portion of the least one layer of liquid photopolymer resin to create a cured floor in the least one layer of liquid photopolymer resin; and
    g) washing away uncured portions of the at least one layer of liquid photopolymer resin to reveal the desired relief image;

wherein at least one of the first source of actinic radiation and the second source of actinic radiation comprises a plurality of UV LED light tubes; and wherein each of the UV LED light tubes has an output intensity of about 10 to about 40 mW/cm$^2$ when arranged at a distance of about 1 to about 2 inches from the surface of the glass platen.

2. The method according to claim 1, wherein both the first source of actinic radiation and the second source of actinic radiation comprises a plurality of UV LED light tubes.

3. The method according to claim 1, wherein the first source of actinic radiation positioned below the first glass platen is a scanning light bar comprising a plurality of UV LEDs.

4. The method according to claim 3, wherein the scanning light bar produces islands of cured photopolymer in the liquid photopolymer resin without the use of a negative.

5. The method according to claim 1, wherein the plurality of UV LED light tubes operate at a wavelength between about 355 nm and about 405 nm.

6. The method according to claim 5, wherein the plurality of UV LED light tubes operate at a wavelength between about 365 nm and about 395 nm.

7. The method according to claim 1, wherein step a) includes the step of securing the negative to the first glass platen, wherein the at least one layer of liquid photopolymer resin is exposed to actinic radiation through the negative to form the desired relief image therein.

8. The method according to claim 1, wherein each of the UV LED light tubes has an output intensity of about 25 to about 35 mW/cm$^2$ when arranged at the distance of about 1 to about 2 inches from the surface of the glass platen.

9. The method according to claim 1, wherein each of the UV LED light tubes has a length within a range of about 2 feet to about 10 feet.

10. The method according to claim 9, wherein each of the UV LED light tubes has a length within a range of about 4 to about 8 feet.

11. The method according to claim 1, wherein each of the UV LED light tubes comprises at least three rows of LED chips arranged along the length of the UV LED light tube.

12. The method according to claim 1, wherein the UV LED chips are spaced apart at a distance of about 0.25 inches to about 2 inches along the length of the UV LED light tube.

13. The method according to claim 12, wherein the UV LED chips are spaced apart at a distance of about 0.5 to about 1 inches along the length of the UV LED tube light.

14. The method according to claim 1, wherein the plurality of UV LED light tubes comprises at least 5 UV LED light tubes.

15. The method according to claim 14, wherein the plurality of UV LED light tubes comprises at least 10 UV LED light tubes.

16. The method according to claim 15, wherein the plurality of UV LED light tubes comprises at least 20 UV LED light tubes.

17. The method according to claim 16, wherein the plurality of UV LED light tubes comprises at least 30 UV LED light tubes.

18. The method according to claim 13, wherein the UV LED light tubes are spaced apart at a distance of about 1 inch to about 4 inches on center along the length of the UV LED light tube.

19. The method according to claim 18, wherein the UV LED light tubes are spaced apart at a distance of about 1.5 to about 3 inches on center along the length of the UV LED light tube.

* * * * *